G. W. Cushman,
Cheese Cutter.
No. 99,168.                    Patented Jan. 25, 1870.
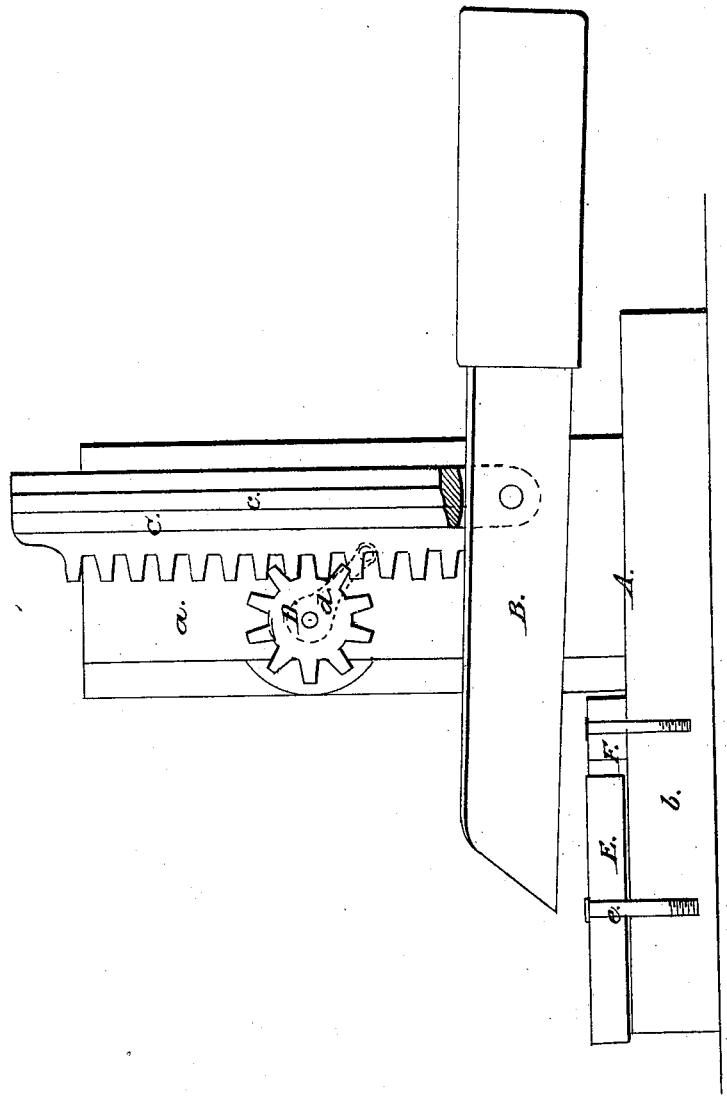
Witnesses:
Fred. Haynes
M. Shauly
Inventor:
G. W. Cushman
PER.
Brown Combs & Co.
attorneys

United States Patent Office.

G. W. CUSHMAN, OF AIKEN, SOUTH CAROLINA.

Letters Patent No. 99,168, dated January 25, 1870.

IMPROVED CHEESE-CUTTER.

The Schedule referred to in these Letters Patent and making part of the same.

*To all whom it may concern:*

Be it known that I, G. W. CUSHMAN, of Aiken, in the district of Barnwell, and State of South Carolina, have invented a new and useful Appliance for Cutting Cheese; and I do hereby declare that the following is a full, clear, and exact description of the same, reference being had to the accompanying drawings, forming a part of this specification, and in which is represented a sectional elevation of an appliance for cutting cheese, constructed according to my invention.

The object of this invention is to provide a more accurate and convenient means of cutting cheese for retailing purposes, and is designed for the use of retail provision dealers in supplying their customers.

The invention consists in the combination and arrangement, within a suitable frame, of a pivoted knife, operated by means of a rack and pinion, a rotating platform for supporting the cheese, and a fixed graduated scale for indicating the amount cut from the cheese, whereby almost the exact amount desired may be cut from the cheese with comparative certainty, without weighing, and with more convenience than by the ordinary means.

Referring to the accompanying drawing—

A is a frame, constructed of cast-iron or other metal, and composed of two upright pieces, *a a*; one not shown, and a horizontal base-plate, *b*.

C is a vertically-arranged sliding rack, having tongues *c c*, one not shown, fitted to slide within grooves or ways cut in the inner sides of the upright pieces *a a*, and gearing with a pinion, D.

This pinion D is secured upon a horizontal shaft, *d*, which passes through both the said upright pieces *a a*, in such position and manner as to effect an engagement of the spurs of the pinion D with those of the rack C, so that the turning of the shaft will cause the upward or downward sliding of the rack.

Upon the lower end of this rack C is carried a knife, B. Said knife B is horizontally arranged with its cutting-edge downward, and pivoted, at or near its central portion, to the lower end of the rack C, so that the raising or lowering of its handle will cause the contrary movement of its point.

E is a horizontally-arranged rotating platform, of circular form, and designed for reception of the cheese.

Said platform E is so arranged upon the upper side of the base-plate *b* that its centre will come directly, or nearly so, under the point of the knife, and is pivoted through its axial centre to the said base-plate, by means of a bolt, *e*, so that by the turning of the platform, different parts of the cheese may be brought under the knife.

F is a semicircular plate, arranged around that side of the platform nearest the upright pieces *a*, and with its central portion directly under the knife.

Upon the upper surface of this plate F, beginning under the knife and extending toward each extremity, are marked scales for designating pounds and fractions of pounds, so that the amount desired to be cut from the cheese may be designated alike thereby, the platform being turned in either direction.

In operating this invention, the knife is raised by the backward turning of the shaft *d*, which may be effected by means of a crank or otherwise, and the cheese to be cut is placed centrally upon the platform, so that the centre of the cheese will come under the point of the knife.

The knife is then brought down by the forward turning of the shaft, until its edge reaches the surface of the platform at its circumference, cutting into the cheese as it descends.

The raising of the handle of the knife will now cause the point thereof still further to penetrate, and to cut through the cheese, making a radial incision entirely through it.

By again raising the knife in the manner as already described, the platform, together with the cheese, may be turned, so as to bring the said radial incision opposite the mark on the scale corresponding with the amount desired to be cut from the cheese, and the knife again brought down and manipulated as just described.

What I claim as my invention, and desire to have secured by Letters Patent, is—

The pivoted knife B, operated by rack C and pinion D, in combination with the rotating platform E, curved graduated plate F, and frame A, constructed and arranged to operate as herein described for the purpose specified.

G. W. CUSHMAN.

Witnesses:
JOSEPH WOOLLEY,
J. H. H. OSBORNE.